United States Patent
Thienpont

[19]

[11] Patent Number: 6,144,688
[45] Date of Patent: Nov. 7, 2000

[54] HEAT FURNACE HAVING COMPLIMENTARY ELECTRIC HEATING

[76] Inventor: Axel Thienpont, 8 rue de Clairmarais, Taissy, France, 51500

[21] Appl. No.: 09/276,190

[22] Filed: Mar. 25, 1999

[30] Foreign Application Priority Data

Mar. 26, 1998 [FR] France ................................ 98 03758

[51] Int. Cl.[7] .................................................. C03B 5/02
[52] U.S. Cl. ..................... 373/27; 373/5; 373/39
[58] Field of Search ................... 373/27, 29–32, 373/39, 40, 8, 9, 5

[56] References Cited

U.S. PATENT DOCUMENTS 5,243,621  9/1993  McNeill ..................... 373/33

FOREIGN PATENT DOCUMENTS 0 748 773  of 1996  European Pat. Off. .
248 745  of 1948  Switzerland .
263 478  of 1949  Switzerland .

OTHER PUBLICATIONS

Preliminary Search Report dated Nov. 12, 1998, FR 9803758.

Primary Examiner—Tu Ba Hoang
Attorney, Agent, or Firm—Baker & Daniels

[57] ABSTRACT

A furnace having a combustion chamber, a fuel inlet for the combustion chamber, an electric heater operatively coupled with the combustion chamber, an electric generator coupled to the electric heater, and an internal combustion engine for driving the electric generator. The internal combustion engine includes an exhaust and a conduit. The conduit couples the exhaust to the combustion chamber.

8 Claims, 1 Drawing Sheet

HEAT FURNACE HAVING COMPLIMENTARY ELECTRIC HEATING

BACKGROUND OF THE INVENTION

1. Field of the Invention

The present invention relates to a heat furnace, in particular a glass furnace, the charge of which is heated to a high temperature by combustion of a fuel, this furnace being filled with electrical resistors to provide complementary electrical heating.

The invention applies in general to combustion furnaces and in particular to air heating furnaces of the regenerative type such as glass furnaces.

2. Description of the Related Art

In the prior art, a heat furnace uses a fuel to heat a charge. The combustion creates pollutant products such as $CO_2$, NOx, SOx gases and dusts. These pollutant products are measured in the fumes downstream of the furnace. There are various requirements which need to be applied when operating a furnace and the methods used to meet these requirements, including the heat output of the furnace and reduction of pollutant products, often give rise to contradictory results.

Accordingly, the thermal performance of a furnace can be improved by pre-heating combustive gases, such as air or a mixture of air and recycled gas from a system which recycles or regenerates energy from the fumes emitted by the furnace.

In practice, most glass furnaces are more specifically fitted with a heat recycling system. The fumes leaving the furnace pass through a solid heat recovery mass in the form of packing, which is heated by contact with the fumes before they are evacuated to the exterior. A recycling system of this type is also provided at the intake of the furnace. The combustive gases pass through it and are heated in this recycling system as they do so.

In effect, the furnace operates on an alternating system, whereby the combustive gases and the fumes are circulated between the intake and the outlet first in one direction and then in the opposite direction, so that the output becomes the intake and the intake the output. At each stage of operation, fumes are fed through the recycling system located at the output which therefore recovers heat whilst the recycling system located at the intake, through which the fumes were fed during the previous stage, now has the combustive gases passing through it so that these are heated as they come into contact with the mass of heat which has built up in the recycling system.

This system of pre-heating the combustive gases has a significant effect in terms of the heat output of the furnace but, unfortunately, it increases the amount of noxious nitrous oxides, NOx, produced.

There is another solution for improving the output of the furnace, which consists of supplying energy by Joule effect inside the furnace or at the charge. This method of operating a glass furnace, known as "electric boosting", improves the overall performance of the furnace and enables the emission of NOx compounds to be reduced.

Finally, in order to reduce the emission of pollutant NOx gases, another solution is to operate a partial re-circulation of the combustion gases by injecting them back into the combustive gases upstream of the main combustion zone.

SUMMARY OF THE INVENTION

The objective of the present invention is to improve the output of a furnace in which the charge is heated to a high temperature by burning a fuel whilst reducing the emission of pollutant products, in particular nitrous oxides, NOx.

To this end, the invention relates to a heat furnace of the type defined above, characterised in that it comprises:

a thermal engine and an electricity generator driven by the thermal engine to supply at least some of the electric heating;

the exhaust for the combustion gases from the engine being linked to the flow of combustive gases supplying the combustion zone of the furnace.

The combination proposed by the invention enables the overall efficiency of the fuels used by the furnace and the engine to be improved, the latter being such that it uses the same or a different fuel from that of the furnace, namely the fuel burned directly in the furnace and that supplying the thermal engine driving the generator. With this combination, some of the calorific energy from the fuel used by the engine can be efficiently transferred to the furnace charge by Joule effect and can be so with a higher global energy output than that of the furnace and its heat recovery system.

By dint of one advantageous feature of the invention, the furnace has a heat recovery system upstream of the furnace to heat the combustive gases whilst the combustion gases from the thermal engine are injected into the recovery system or upstream or downstream thereof into the furnace.

The three injection modes may be controlled separately by valves; the injection processes may also be operated simultaneously in accordance with a selected distribution.

The thermal engine driving the generator may be a piston engine or a turbine.

The present invention will be described in more detail below with reference to the diagram of the heat furnace proposed by the invention.

DETAILED DESCRIPTION OF THE INVENTION

Figure 1:
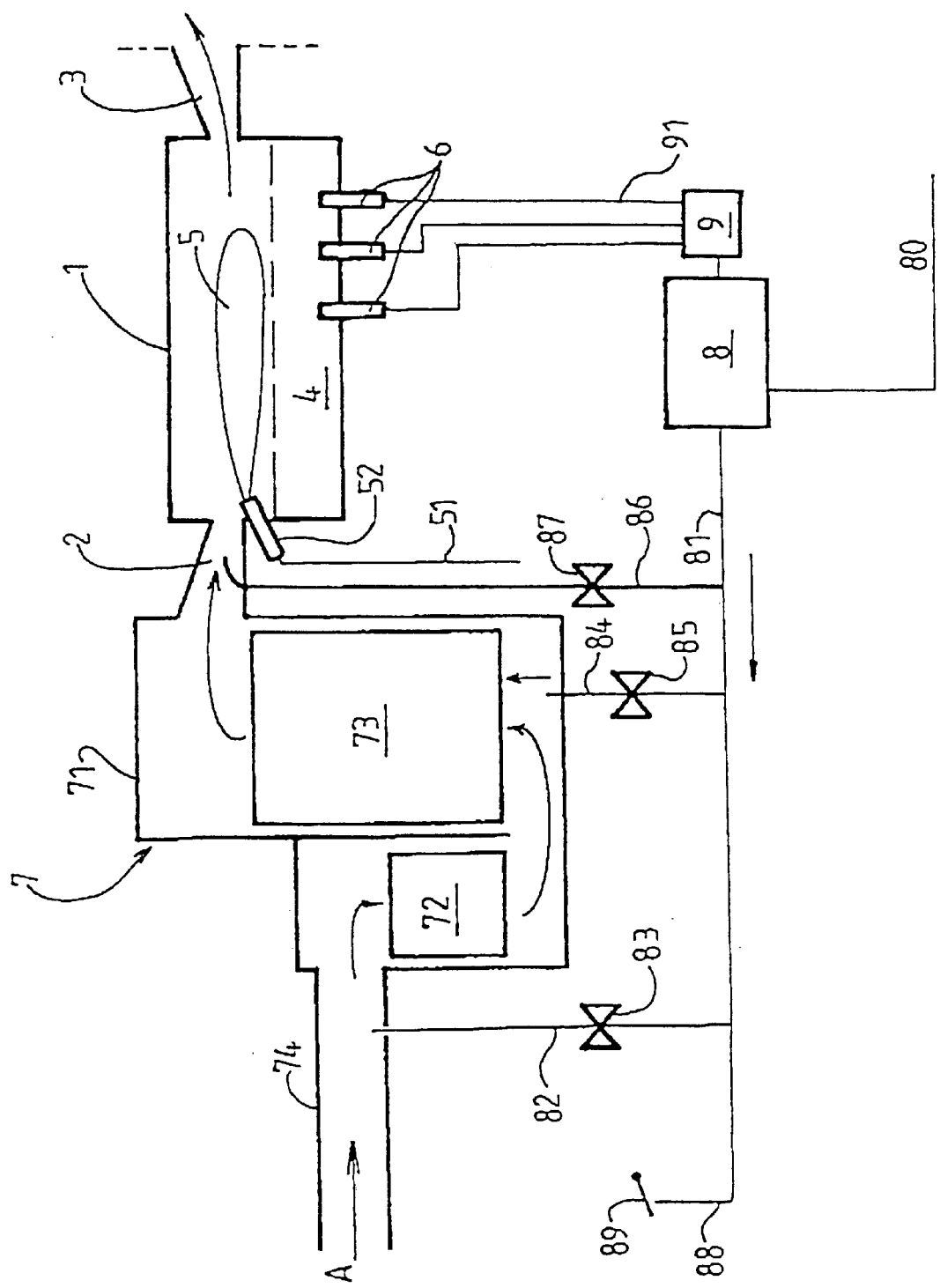

In FIG. 1, the heat furnace system proposed by the invention consists of the furnace 1 itself, provided with an inlet 2 for combustive gases and an outlet 3 for fumes. The furnace contains a charge 4 heated by a main combustion zone 5 having at least one burner supplied with fuel. The furnace 1 is also provided with a means of electric heating 6, for example electrodes penetrating the charge 4 so as to provide complementary heating for the charge by a boosting effect.

It should be pointed out that the furnace 1 operates in an alternating reversible manner so that the inlet for the combustive gases 2 becomes the outlet for the fumes and conversely the outlet for the fumes 3 becomes the inlet for the combustive gases.

For the sake of simplicity, the drawing is restricted to only those parts located on inlet 2 side, the equipment at the outlet for the fumes 3 being almost symmetrical. The same applies to the main combustion zone 5 provided on the side at which the combustive gases 2 arrive. A main combustion zone of the same type also exists close to the outlet for the fumes 3 and is used when the fume outlet 3 is operating as an intake for the combustive gases.

Provided upstream of the inlet 2, is a heat recovery system 7 consisting of an enclosure 71 containing a charge 72, 73, generally comprising packing in the form of refractory materials, through which the combustion gases can flow to pick up heat or transmit heat to the combustive gases. The inlet for the combustive gases in the heat recovery system 7 is shown by reference 74. The direction in which the combustive gases flow is indicated by the arrow A.

For the purposes of the invention, the plant is equipped with a thermal engine 8, supplied with fuel via the line 80 and driving an electric generator 9 connected by an electrical link 91 to the electric hearing means 6 of the furnace 1. The combustion gases from the thermal engine 8 are fed via the exhaust 81 either to the intake of the heat recovery system 7 via the line 82 fitted with a valve 83 or to an intermediate level of the recovery system 7 via the line 84 controlled by the valve 85 or to a level downstream, in the direction of flow of the combustive gases shown by arrow A, via a line 86 fitted with a valve 87 opening into the inlet 2 of the furnace 1. By operating the valves 83, 85, 87, the combustion gases from the thermal engine 8 can be distributed between the upstream section of the recovery system 7 (line 82), an intermediate position (line 84) and a position downstream of the exchanger or into the furnace enclosure (line 86). Now the distribution of exhaust gases between the three injection options is controlled will depend on various parameters relating in particular to the nature of the products charging the furnace and the way the furnace is operated.

This distribution system can be operated to allow injection through one line only, through two lines, or through all three lines.

There is an advantage to be had if the valves 83, 85, 87 are automatically controlled.

The exhaust 81 of the engine 8 is provided with an air vent 88, optionally fitted with a valve 89 to regulate the pressure in the line 81.

Finally, it should be pointed out that since the combustion gases from the engine 8 are re-combusted in the furnace, combustion of the engine can be regulated at a stoichiometric or sub-stoichiometric level to optimise the output of the system depending on operating requirements.

In practice, since one of the requirements is to reduce NOx, those produced by combustion of the thermal engine will vary in the same direction as the excess combustion air. One technique which is currently used is to reduce these NOx by regulating combustion of the engine stoichiometrically or sub-stoichiometrically, with the disadvantage that unburned gases are produced. If the exhaust gases from a combustion system of this type are re-injected into the flow of combustive gases supplying the furnace, this drawback is overcome since the unburned gases will now be re-combusted.

The thermal engine 8 may be an internal combustion engine or a turbine and its fuel may be the same fuel as that used to supply the burner 52 via supply line 51 or may be a different fuel.

What is claimed is:

1. A furnace comprising:

a combustion chamber;

a combustive gas inlet for said combustion chamber;

an electric heater operatively coupled with said combustion chamber;

an electric generator coupled to said electric heater; and an internal combustion engine for driving said electric generator.

2. The furnace of claim 1, wherein said internal combustion engine includes an exhaust and a conduit, said conduit coupling said exhaust to said combustion chamber.

3. The furnace of claim 1, wherein said internal combustion engine includes an exhaust and a conduit having a valve, said conduit coupling said exhaust to said inlet.

4. The furnace of claim 1, further comprising a heat recovery system disposed between and fluidly coupling said combustion chamber and said inlet.

5. The furnace of claim 4, wherein said internal combustion engine includes an exhaust and a conduit having a valve, said conduit coupling said exhaust to said heat recovery system.

6. The furnace of claim 4, wherein said internal combustion engine includes an exhaust and a conduit, said conduit including a first branch, a second branch and a third branch, each of said branches having a valve, said first branch coupling said exhaust to said inlet, said second branch coupling said exhaust to said heat recovery system, said third branch coupling said exhaust to said combustion chamber.

7. The furnace of claim 6, wherein said valves are automatically controlled.

8. The furnace of claim 1, wherein said conduit includes a valve to regulate the pressure in said conduit.

* * * * *

UNITED STATES PATENT AND TRADEMARK OFFICE
CERTIFICATE OF CORRECTION

PATENT NO. : 6,144,688
DATED : November 7, 2000
INVENTOR(S) : Axel Thienpont

It is certified that error appears in the above-identified patent and that said Letters Patent are hereby corrected as shown below:

In the title, change the word "COMPLIMENTARY" to - -COMPLEMENTARY- -

Signed and Sealed this

Eighth Day of May, 2001

Attest:

NICHOLAS P. GODICI

*Attesting Officer*     *Acting Director of the United States Patent and Trademark Office*